Dec. 28, 1965  H. GLÖCKL  3,225,458

HELICOPTER TRAINING DEVICE

Filed May 21, 1962  2 Sheets-Sheet 1

Inventor:
HANS GLÖCKL
By:
McGlew and Toren
Attorneys

Dec. 28, 1965     H. GLÖCKL     3,225,458

HELICOPTER TRAINING DEVICE

Filed May 21, 1962     2 Sheets-Sheet 2

Inventor:
HANS GLÖCKL
By:
McGlew and Toren
Attorneys

3,225,458
HELICOPTER TRAINING DEVICE
Hans Glöckl, Munich, Germany, assignor to Firma Bolkow Gesellschaft mit beschrankter Haftung, Munich, Germany
Filed May 21, 1962, Ser. No. 196,394
Claims priority, application Germany, May 26, 1961, B 62,637
2 Claims. (Cl. 35—12)

This invention generally relates to pilot training devices and is particularly directed to an improved helicopter training construction for training pilots in the basic maneuvers of rotary wing aircraft.

The inventive construction is particularly applicable to helicopter training devices of the kind comprising a stationary base or foundation, a rotatable support mounted on said base, a link-comprising undercarriage or frame articulated to the rotatable support and being adjustable as to height, and a helicopter plane secured to the undercarriage.

Prior art helicopter training devices of the kind referred to permit rotary and vertical movement of the helicopter plane relative to the stationary base so as to simulate the turning movements of a helicopter about a vertical axis and ascent and descent in a direction along such vertical axis. However, as is known by those skilled in the art, prior art helicopter training devices of this kind do not permit simulation of the tilting or slanting of the helicopter which is generally necessary for the purpose of horizontal acceleration of the plane.

With a view to imitating helicopter inclination about a horizontal axis which prevails during the actual forward flight of a helicopter and to enabling the student pilot to learn control of the helicopter during such conditions, it has been suggested to place such helicopter training devices on a rotation-symmetrical float which in turn is accommodated in a water tank, pool or the like. If the helicopter training device is supported by such float, then in addition to vertical movement and turning movements, about a vertical axis, two further translatory and rotary movements are rendered possible. Therefore, a helicopter training device which floats on a water surface has substantially the same degree of freedom as has a helicopter proper during actual flight.

However, it is well recognized by those skilled in the construction and design of helicopter training devices that mounting on a rotation-symmetrical float results in several serious drawbacks. Firstly, the float, relative to the control forces, exhibits a larger mass and thus a greater moment of inertia than does a helicopter proper during flight. This greater moment of inertia causes, in turn, reduced sensitivity to the control deflections controlling the flight movements of the aircraft in longitudinal and transverse directions. Secondly, the ratio of rotor thrust; total weight is smaller in a helicopter training device than in a helicopter proper. Due to this smaller ratio and as the float during tilting of the training device is supported on the water surface, control stick movements have to be performed during braking and acceleration which do not reflect the control stick movements as they are performed during actual flight conditions. Thus, in a float supported helicopter training device, the control stick movements are much greater and exaggerated both with regard to amount of time and with regard to deflection path, if compared to such movements during actual flight of a helicopter. It will be readily realized that no skill in actual helicopter flying can be acquired if the training maneuvers do not reflect the actual conditions. Thirdly, the use of a float supported helicopter training device is, of course, dependent on weather conditions and it will be readily realized that under normal circumstances such a device cannot be used at freezing temperatures as the water surface is then frozen.

In this connection, it should also be mentioned that, considered from a pedagogical point of view, possibilities for horizontal movements of the training device have secondary importance only because, during actual flight conditions, such movements take place only after a change in position of the helicopter has taken place. For this reason, the training of helicopter pilots can successfully be accomplished on stationary training devices which do not permit horizontal movement.

Recently, helicopter training devices have been introduced which consist of a rotary wing unit which is provided with rotors and is connected via a carrier arm with the top or peak of a tower. The rotary wing unit is capable of performing circulatory movements about the tower and of ascending or descending within predetermined ranges which are determined by the construction of the carrier arm and the mounting means between the unit, the carrier arm and the tower. In these constructions the carrier arm is customarily provided with a counterweight with which the rotary wing unit is maintained in equilibrium independent from the height position of the training device. However, also in this type of helicopter training device, large mass forces have to be overcome during forward flight and, of course, any movability of the device transverse to its direction of flight is rendered impossible. Therefore, this type of training device does not faithfully simulate or reflect the reactions of a helicopter proper during flight. It should also be mentioned that this type of training device is exceedingly expensive and cumbersome to construct.

It is accordingly a primary object of this invention to overcome the disadvantages of prior art helicopter training devices by providing a helicopter training device of the kind referred to which permits simulation of all the important control movements as they are performed in a helicopter proper during actual flight except for horizontal forward flight.

Another object of this invention is to provide a helicopter training device wherein not only can the pilot actuate controls to simulate the essential maneuvers and and movements as they are required during actual flight, but wherein also the degree of control movements for effecting such maneuvers corresponds to actual flight conditions.

A further object of this invention is to provide a helicopter training device wherein actuation of the controls results in movements and position adjustments which are faithful reproductions of the movements and position adjustments as they do occur during actual flight conditions when the same control actuation is performed.

It is also an object of this invention to provide a helicopter training device which is of simple and rugged construction and which may be built at a minimum of expense.

Generally it is an object of this invention to improve on the art of helicopter training devices as presently practiced.

Briefly, a helicopter training device in accordance with this invention is provided with a joint between the base and the rotatable support which joint permits titlting or slanting of the helicopter plane about at least one horizontal axis.

For this purpose, universal or swivel joints such as ball joints or cardan joints may advantageously be used.

The provision of the joint between the stationary base and the rotatable support permits tilting or inclination of the helicopter plane about any desired horizontal axis.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there are illustrated and described preferred embodiments of the invention.

Figure 1:
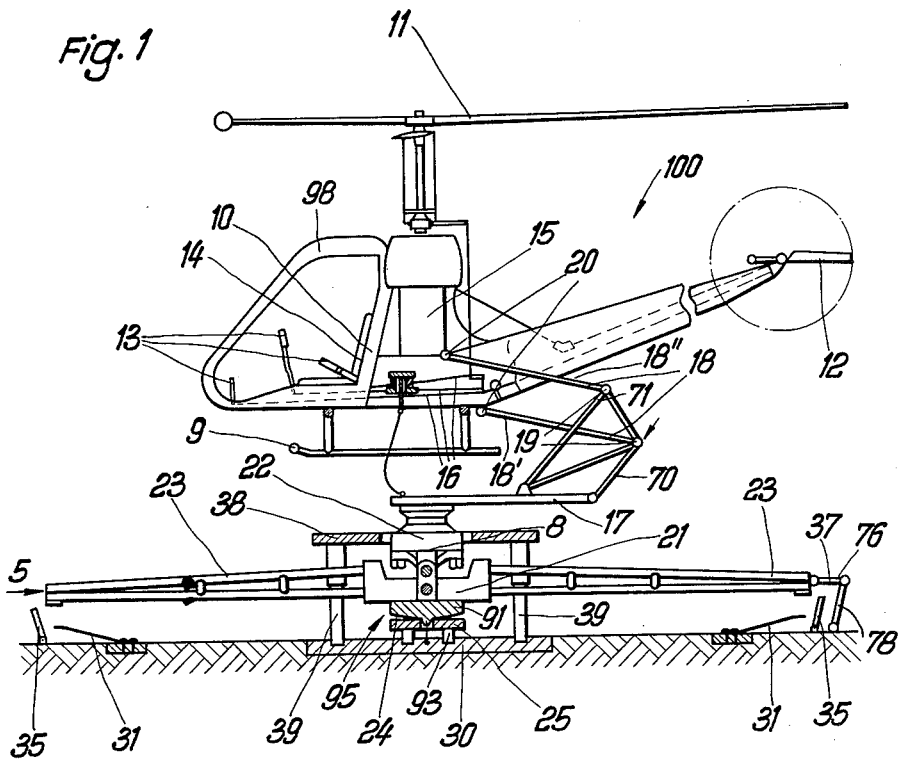
FIG. 1 is a somewhat diagrammatical side elevation of one embodiment of a helicopter training device in accordance with this invention partly in section.
Figure 2:
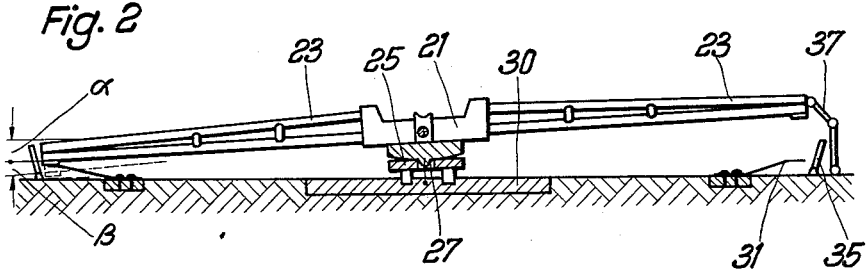
FIG. 2 shows the lower joint-containing portion of the device in tilted position.
Figure 4:
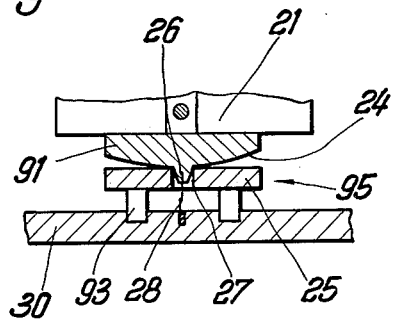
FIG. 4 illustrates on enlarged scale a longitudinal section through the joint of FIGS. 1 and 2.

Referring now to the drawings and to FIGS. 1, 2 and 4 in particular, the helicopter training device of this embodiment is generally indicated by reference numeral 100 and comprises an operative helicopter plane 10 including a main rotor 11 and a tail rotor 12. Control actuating means generally indicated by reference numeral 13 in the form of control sticks, foot pedals and the like are arranged within the helicopter cabin 98 and are conveniently reachable from the pilot seat 14. The control actuating means 13 are operatively connected in the usual manner with both the main rotor 11 and the tail rotor 12 by means of transmission cables, as for example, schematically indicated by reference numeral 16. The pilot thus controls the movements of the helicopter plane by actuating the control actuating means 13. A motor 15 is mounted behind the cabin 98 and drives both the main rotor 11 and also the tail rotor 12.

It will be noted that the main rotor 11 is operatively connected with an undercarriage or frame structure 17, the connection being accomplished by a linkage as indicated by reference numeral 18. The linkage 18 comprises links 18' and 18" which extend in parallel manner to each other and are also displaceable in parallel manner by being articulated to the joints 19 and 20, respectively. Additional supporting links of the linkage are indicated at 70 and 71. The undercarriage 17 is rotatable about a vertical axis relative to a base or foundation member 30. For this purpose, a rotatable joint generally indicated by reference numeral 8 is interpositioned between a support member 21 and the carriage 17. FIG. 1 also indicates diagrammatically a brake 22 for the purpose of braking the rotary movement of the carriage and thus of the helicopter plane 10 in accordance with the requirements. The braking device 22 may be actuated from the pilot cabin.

The entire device rests on the foundation or base member 30. The structure described hereinabove is conventional in helicopter training devices of this kind and no structural illustration of this structure has therefore been included.

In accordance with the invention, a joint is interpositioned between the support member 21 and the foundation 30. The joint generally indicated by reference numeral 95 permits inclinations of the helicopter plane 10 about at least one horizontal axis. In the embodiment shown in FIGS. 1, 2 and 4, the joint 95 includes a stationary support surface element 25, which is secured to the foundation 30 by means of members 93, and a joint element 91 which includes a ball-shaped surface 24 which is capable of engagement with the support surface 25. The element 91 with ball surface 24 is fast with the support element 21 and it will be noted that the joint 95 in its entirety is located between the foundation 30 and the joint support 21. As element 91 is fast on support 21 and the rotary joint 8 is secured to support 21, joint 8 is thus operatively connected with the element 91 of joint 95.

Means are provided for preventing lateral displacement of the ball surface containing element 91 relative to the stationary support surface 25. Furthermore, the construction here illustrated includes means for preventing lifting of element 91 from the support surface 25 and/or rotation of element 91 about a vertical axis. For this purpose, as seen in FIGS. 1, 2 and 4, element 91 is integral with a downwardly extending centrally arranged pin member 26 which projects into a recess portion 27 of the support surface member 25. In the present embodiment, recess 27 is a cylindrical bore. The dimensions of the recess or bore 27 within the support surface 25 are chosen with regard to shape and size so that pin 26 is capable of moving within the recess 27 while, however, a relative displacement between ball surface 24 and support surface 25 is rendered impossible.

With a view to obtaining an indifferent equilibrium or balance over the entire inclination range of the helicopter plane, the radius of the ball surface 24 is equal to the distance of the center of gravity of the inclined portion of the device above the support surface 25, when the helicopter 10 is in its center height position.

In this connection, it should be stated that the ball-shaped surface 24 in some instances may have a smaller curvature at its center portions than at its peripheral portions. Such variations in the curvature of the ball surface tend to compensate for possible form changes within the device which, for example, may consist in a slight bending of the linkage or rod system 18 which carries the helicopter plane and which may be caused by a displacement of the center of gravity during the inclined positions of the device.

As stated hereinbefore, in the embodiment of FIGS. 1, 2 and 4, the recess portion 27 is in the form of a cylindrical bore which traverses the support surface member 25, while the pin 26 which projects into the bore has a circular cross section while its longitudinal section corresponds substantially to the form of a circular involute. This construction ensures that, independent from the angle of inclination of the device, the pin 26 will always bear against two opposite points in the axis of inclination, so that any relative displacement of the two joint halves, that is, members 25 and 91, is rendered impossible. This construction is clearly illustrated in FIG. 4 wherein the pin 26 and the bore 27 in the support member 25 have the indicated form. FIG. 4 moreover illustrates the manner in which lifting of the member 91 from the support 25 is prevented. It will thus be noted that a rope or wire 28 is provided, one end of which is secured at the pin 26, while the opposite end is secured to the foundation 30. The longitudinal extension of the rope or wire 28 is adjusted so that it readily may perform the movement caused by the tilting of the device and corresponding lateral deflection of the pin 26 within the bore 27 without being substantially stretched. On the other hand, the rope 28 is sufficiently short so as to retain the pin 26 within the bore 27.

While the embodiment of FIGS. 1, 2 and 4 provides for a single centrically arranged pin member for centering the joint 95 and for preventing relative displacement between the two joint halves it will, of course, be realized that the invention is not limited to such a construction. Thus, pin 26 can be replaced by two or several pins each of a construction similar to pin 26 of the embodiment here shown, which pins would then be downwardly dependent from the ball surface 24. If a plurality of pins are arranged, then, of course, the pins at the same time would prevent any relative rotation between the two joint halves. It will be realized, however, if several pins are used they would have to be symmetrically arranged.

Figure 3:
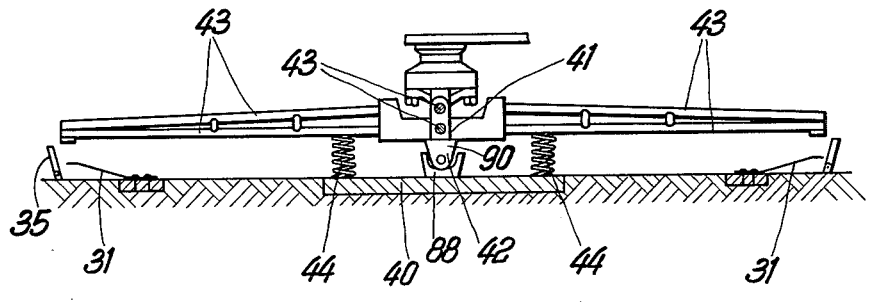
FIG. 3 shows the lower portion of a different embodiment of a helicopter training device in accordance with this invention, wherein a different type of joint is used.

Referring now to FIG. 3, it will be noted that this figure illustrates a different embodiment for the joint between the foundation 40 and the support member 41.

Thus, the ball joint 95 of FIGS. 1, 2 and 4 in the present embodiment is replaced by a cardan joint 42. Again, the male member 90 of the cardan joint 42 is movable relative to the stationary member 88 so as to permit tilting of the helicopter device about at least one horizontal axis.

Figure 5:
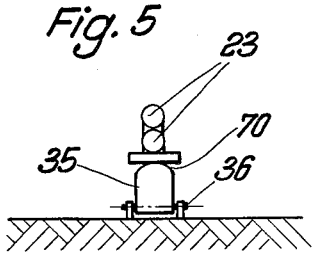
FIG. 5 is a fragmentary end elevation in the direction of the arrow 5 of FIG. 1, on an enlarged scale.

Reference numerals 23 in FIGS. 1, 2 and 5 and reference numeral 43 in the embodiment of FIG. 3 indicate boom or arm members which are secured to the support members 21 and 41, respectively, and which take part in any tilting movement of the helicopter plane. It will be noted that four such arm members 23 or 43 are provided, the angular distance between each arm being 90°. The ends of these arms selectively cooperate with pivotable ground engaging support members 35 in order to block the inclination of the helicopter plane about at least one horizontal axis. Thus, for example, if the ground supporting members 35 shown in the drawing are in a raised position, tilting of the plane towards the left or right, as viewed in FIG. 1, would be prevented.

The distance of the free ends of the arms 23 and 43 to the ground is calculated so as to permit a lateral tilting of the helicopter plane within an angle α which is about −4° (see FIG. 2). With a view to preventing hard impact of the ends of the arms against the ground, elastic abutments 31 may be provided on the ground (see FIGS. 1 and 3). The elasticity of these abutments 31 is chosen so as to permit additional tilting of the arms 23 and 43, respectively, about the angle β of about 2° as indicated in FIG. 2.

In particularly heavy weight training devices, the danger of rough impact of the arm ends against the ground is, of course, particularly serious. In such instances, the elastic abutments 31 may additionally be provided with energy consuming means, that is, for example, shock absorbers or the like. Such shock absorbers have not been indicated in the figures as they may be of conventional construction. If they are provided, care should be taken that the maximum inclination range of the helicopter is not reduced. An inclination range of maximum ±6° has proven to be sufficient for effectively training pilots in the art of flying rotary wing aircraft.

In a helicopter training device of the kind with which the invention is concerned, it is, of course, desirable entirely to prevent tilting or inclination of the device or to block the possibility of tilting about selected horizontal axes. Thus, for example, when the training device is not in use and also during the beginning stages of the training program, tilting about horizontal axes is undesired. Again it is, of course, desirable to teach a student pilot the tilting technique progressively about different horizontal axes, and for this reason means should be provided for preventing tilting about any or some axes while permitting tilting about one or several selected horizontal axes. The provision of the ground support members 35 previously referred to effectively permits control of the inclination movements of the plane about any desired horizontal axis. Thus, for example, if the ground support members 35 are placed below two opposing arm members 23 or 43, respectively, then the helicopter can tilt about one horizontal axis only. In such condition, the student pilot can thus be taught the flying techniques during tilting about each individual horizontal axis. Any rotary movement of the support portion 21 on which the arms 23 or 43 are fast is prevented by means of a scissor member 37 as seen in FIG. 1. The scissor member 37 has one arm 78 which is secured to the ground while the other arm 76 is mounted at the end of the arms.

As seen in FIG. 5, the ground engaging members 35 have rounded top portions 70. The rounded portions 70 are, of course, those portions which are engaged by the arms 23. The rounding is provided in order to minimize resistance to the inclination of the helicopter about the horizontal axis which extends in the direction of two opposite arms which are engaged by the ground engaging members 35.

In the event that a cardan joint is interpositioned between the foundation of the device and the base portion 21 or 41, respectively, the suspension is, of course, somewhat unstable. For this purpose, springs 44 may be provided as shown in FIG. 3, which extend between the ground and the arms 43. These compression springs oppose any deflection of the device away from its center position with a force so that the tilting moment generated by the gravity of the entire device is almost compensated for. The compression springs of FIG. 3 could, of course, be replaced by tension springs. The springs could also be replaced by other resilient elements, such as rubber members bearing against the four arms and the ground.

In some instances, it may be desired to provide additional means for preventing lateral inclination of the helicopter. This may be accomplished by arranging a platform 38 as seen in FIG. 1. The platform is arranged above the joint 95 and within the movement range of the landing gear 9 of the helicopter. The platform is rigidly connected with the foundation 30 by means of supports 39 which may include shock absorbers. During landing, the landing skids 9 of the helicopter will engage the top face of the platform 38. Such a construction not only blocks inclination, but at the same time brakes the rotary movement about the vertical axis.

Braking of the rotary movement about the vertical axis may be effected in different manner. Thus, for example, automatic release means may act on the previously described brake means 22 which release means are automatically actuated during the descent movement of the helicopter plane 10 into its landing position. If such automatically actuated braking means are provided, then no platform 38 is required. In such instance, the inclination of the helicopter is exclusively blocked by the action of the ground engaging members 35.

It will be realized that independent from the actual construction of the joint between the foundation and the rotary joint, the inventive construction provides for a helicopter training device wherein the student pilot readily and quickly may learn all the essential flying movements, except, of course, for horizontal forward flight. The inventive construction simulates the actual flying conditions in a most satisfactory manner and each of the control movements resulting from actuation of the control sticks is performed with a sensitivity which substantially corresponds to actual flight conditions.

Due to the provision of the tilting permitting joint between the foundation and the rotary joint, wherein the ball surface rolls on the stationary support surface, the main rotor of the helicopter, with any given dimension of the device, has the maximum distance from the center of gravity. In this manner large moments are produced which tend to tilt the helicopter even if the motor output is low. Further, the construction results in great sensitivity to control stick movements effected by the pilot.

In the event that the radius of the ball surface is equal to the distance of the center of gravity of the tilting portion of the device to the support surface of the joint, when the plane is in its center height position, an indifferent equilibrium condition is effectively obtained over the entire tilting range of the device, whereby, of course, the sensitivity and response of the device to the actuation of the controls is greatly enhanced. The indifferent equilibrium conditions can, however, equally successfully be obtained by suspending the plane in labile manner by providing elastic means which in each instance compensate for the deflecting force.

In the event that a cardan joint is employed a labile equilibrium of the helicopter about its longitudinal and transverse axes is effectively obtained. The desired equilibrium condition as a function of the tilting angle is then attained by suitable restoring means of the kind indicated.

While specific embodiments of the invention have been shown and described in detail to illustrate the application of the inventive principles, it will be understood that this invention may be embodied otherwise without departing from such principles.

What is claimed is:

1. A helicopter construction comprising, in combination, a stationary base, rotary support means above said base, a mechanical swivel linkage between said rotary support means and said base and permitting tilting of said rotary support means relative to said base about at least one horizontal axis, a helicopter plane above said rotary support means, linkage means connected to and interpositioned between said helicopter plane and said rotary support means for permitting ascent and descent of said helicopter plane relative to said stationary base, and a platform above said mechanical swivel linkage and below said plane, said plane having a landing gear and said platform extending in the range of movement of said landing gear during the descent of said plane, said platform being rigidly connected with said stationary base by means of leg means extending between said base and said platform.

2. A helicopter construction as claimed in claim 1, wherein said leg means comprise shock absorbing elements.

References Cited by the Examiner
UNITED STATES PATENTS

| | | | |
|---|---|---|---|
| 1,131,486 | 3/1915 | Derschmidt | 35—12 |
| 2,359,036 | 9/1944 | Harper | 14—16 |
| 2,524,238 | 10/1950 | Soule | 35—12 X |
| 2,695,783 | 11/1954 | Serafin | 35—12 |
| 2,896,947 | 7/1959 | Jacobs | 35—12 |
| 2,916,832 | 12/1959 | Hoffman | 35—12 |
| 2,945,248 | 7/1960 | Meagher et al. | 14—16 |
| 2,954,614 | 10/1960 | Vogt | 35—12 |
| 3,067,528 | 12/1962 | Agusta | 35—12 |
| 3,137,500 | 6/1964 | Stensager | 35—12 X |

FOREIGN PATENTS

| | | |
|---|---|---|
| 881,928 | 11/1961 | Great Britain. |
| 1,111,031 | 7/1961 | Germany. |

EUGENE R. CAPOZIO, *Primary Examiner.*

A. BERLIN, LAWRENCE CHARLES, JEROME SCHNALL, *Examiners.*